United States Patent [19]
Cox

[11] Patent Number: 6,050,016
[45] Date of Patent: Apr. 18, 2000

[54] SCENT DISPENSER AND METHOD

[76] Inventor: Larry R. Cox, 5540 Sullivantown Rd., Walkertown, N.C. 27051

[21] Appl. No.: 08/980,291

[22] Filed: Nov. 28, 1997

[51] Int. Cl.⁷ ...................................................... A01M 1/20
[52] U.S. Cl. ...................................................... 43/1; 43/129
[58] Field of Search ................................. 43/1, 126, 129; 119/51.11

[56] References Cited

U.S. PATENT DOCUMENTS

| | | | |
|---|---|---|---|
| 4,860,488 | 8/1989 | Shigetoyo | 43/129 |
| 5,168,654 | 12/1992 | Chien | 43/129 |
| 5,282,334 | 2/1994 | Kimura | 43/129 |
| 5,299,376 | 4/1994 | Roberts | 43/1 |
| 5,335,446 | 8/1994 | Shigetoyo | 43/129 |
| 5,566,502 | 10/1996 | Shigetoyo | 43/129 |

*Primary Examiner*—Kurt Rowan

[57] ABSTRACT

A scent dispenser including a housing and a hook for suspending the dispenser attached to the housing is provided. The housing includes a pair of aligned openings to draw air through the housing and across a scent receptacle. Battery powered circuitry connects a fan to timer circuitry and to a photo cell for control of the fan during scent dispersion. An LED is provided to indicate the operating status of the device while a toggle switch provides manual on/off control.

8 Claims, 5 Drawing Sheets

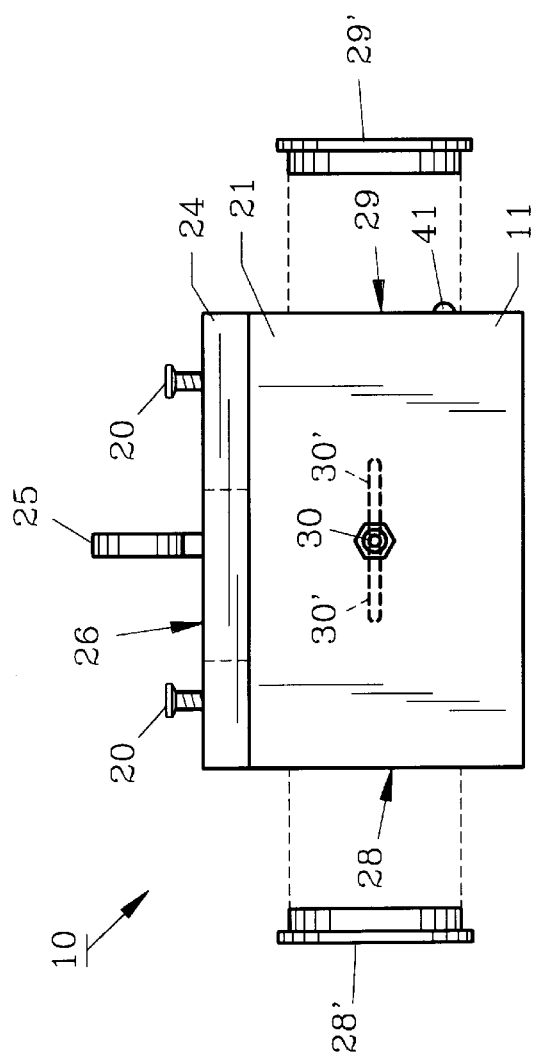
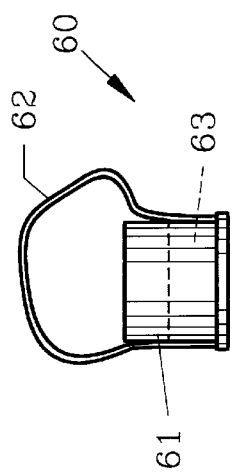
FIG. 2
FIG. 6

SCENT DISPENSER AND METHOD

BACKGROUND OF THE INVENTION

1. Field of the Invention

This invention pertains to a device for emitting a scent, especially to attract game while hunting.

2. Description of the Prior Art and Objectives of the Invention

In recent years, the use of scents to attract game while hunting has become more prevalent. This allows the hunter to more easily locate game and attract it to a specific location. Scents are usually applied to objects and left within the field of vision of the hunter. While helpful, this method of attracting game can result in excessive use of scents as rain and other natural factors may cause the scent to be diluted or otherwise spent. Likewise, there may be times when the hunter does not wish the scent to be emitted, for example when the hunter is not present at the hunting grounds, or when hunting is not allowed, such as at night.

Several devices have been contemplated to dispense a scent for this purpose such as those found in U.S. Pat. Nos. 5,094,025; 4,989,547; and 5,305,541, but these devices fail to provide a light sensitive scent emitting device, or they require expensive components which raise the cost of manufacturing. Likewise, prior devices are not necessarily easy to position close to the tree stand used by the hunter, in that certain ones must be positioned on a flat, stable surface.

Therefore, with the above concerns in mind, it is an objective of the present invention to provide a scent dispenser which is lightweight and easy to manufacture.

It is a further objective of the present invention to provide a scent dispenser which has a timer so that the scent may be selectively dispensed for a predetermined time interval.

It is yet a further objective of the present invention to provide a scent dispenser which has a photo cell which activates a fan when surrounding light levels reach a certain intensity.

It is still a further objective of the present invention to provide a scent dispenser with an LED which visually indicates whether the scent dispenser is working.

It is another objective to provide a scent dispenser which is easily suspended from a tree branch or in a similar manner.

It is yet another objective to provide a scent dispenser which uses battery power to control the fan and internal circuitry.

It is still another objective to provide a scent dispenser whose housing defines a pair of aligned openings for the dispersion of scent therethrough and method of use.

These and further objectives and advantages will be realized upon closer examination of the following detailed description and drawings.

SUMMARY OF THE INVENTION

A scent dispenser is provided, comprising a housing, a fan, battery operated electrical circuitry and a hook for hanging the apparatus from a tree or similar item. The housing is formed from ABS plastic and includes a lid which is attached to the housing by conventional fasteners such as screws. The hook is attached to the lid of the housing. The housing defines an intake opening and an exhaust opening which are axially aligned on opposite sides of the housing. Within the housing, rigid plastic walls form several chambers. One chamber contains a scent receptacle, in which a liquid scent soaked cloth is deposited. A fan rests in an aluminum interior wall proximate the scent receptacle and aligned with both the intake opening and the exhaust opening. Air is drawn through the intake opening by the fan, through the fan, across the scent receptacle and out the exhaust opening. Conventional nine volt batteries provide power to the fan as needed. Electrical circuitry disposed on a printed circuit board, comprising a timer and a photo cell, selectively controls when and how long the fan operates as determined by the user. A conventional toggle switch turns on the electrical circuitry as desired by the user. An additional opening may be defined by the top in order to place the scent receptacle in the housing without removing the top.

BRIEF DESCRIPTION OF THE DRAWINGS

FIG. 2 illustrates a left side view of the scent dispenser of FIG. 1 with the top attached and a toggle switch exposed;

FIG. 6 pictures the scent receptacle of the invention removed from the scent dispenser.

DETAILED DESCRIPTION OF THE PREFERRED EMBODIMENT AND OPERATION OF THE INVENTION

Figure 1:
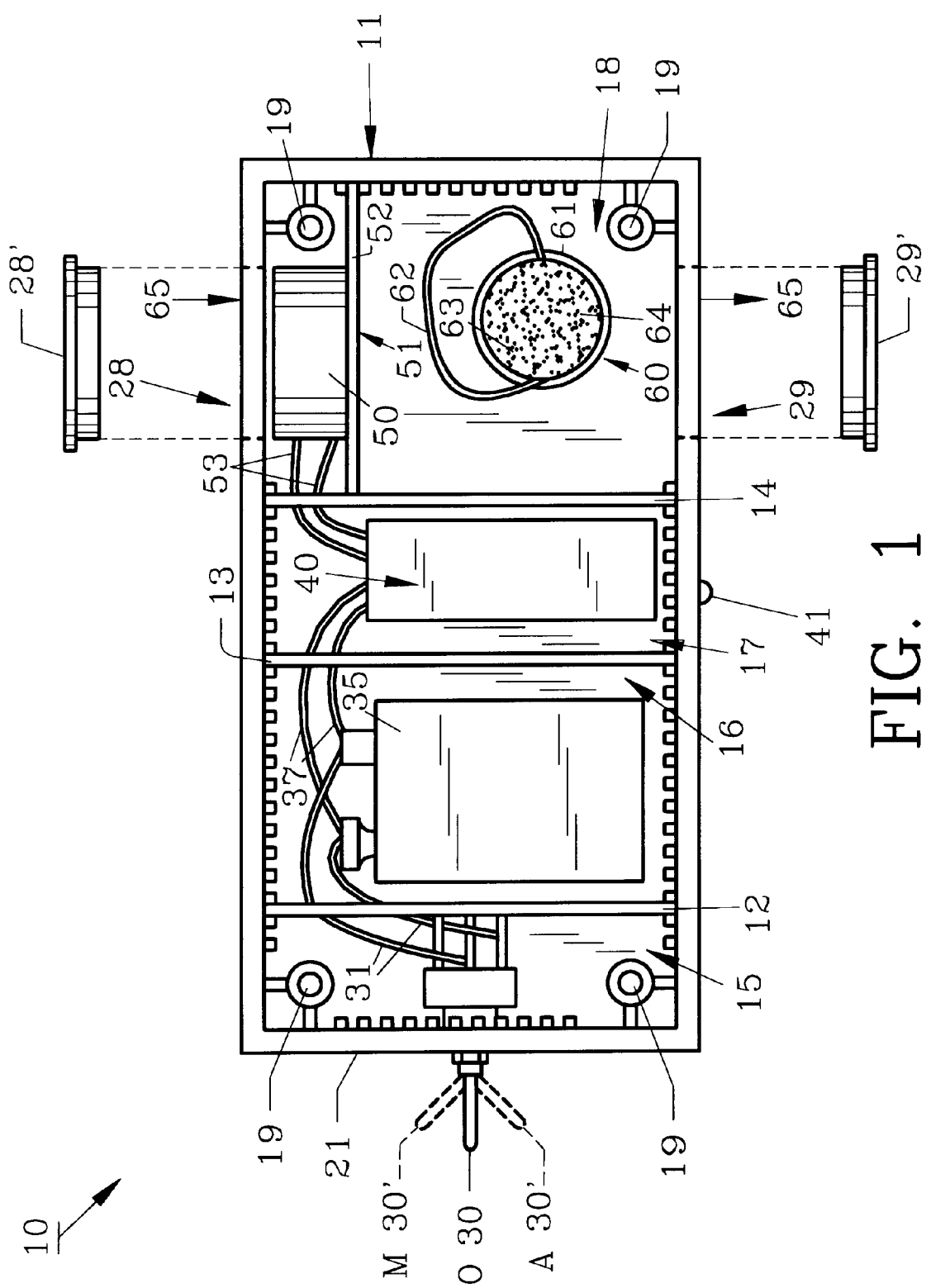
FIG. 1 shows a top elevational view of the preferred scent dispenser with the lid removed.

Turning now to the drawings, specifically FIG. 1 shows a top elevational view of preferred scent dispenser 10. Scent dispenser 10 includes housing 11 which is formed from ABS plastic. Housing 11 is divided by rigid lateral, first, second and third plastic walls 12–14 respectively, separating housing 11 into first chamber 15, second chamber 16, third chamber 17 and fourth 18. Housing 11 is preferably rectangular and has a height (top to bottom) of 3.81 cm, longitudinal width (left to right in FIG. 1) of 12.45 cm and a lateral width of 6.35 cm. Fastener posts 19 are located in the four corners of housing 11 and receive fasteners 20 (FIGS. 2 and 3), which are preferably screws, but bolts or other fasteners may be used. On left side 21, conventional toggle switch 30 extends through housing 11. Toggle switch 30 is a conventional three position toggle switch. The three positions are manual, off, and automatic (M-O-A on FIG. 1), whereby in the manual position, scent dispenser 10 blows scented air continuously. The off position creates an open circuit, precluding scent dispenser 10 from functioning. The automatic position activates electrical circuitry 40 so that scent dispenser 10 selectively dispenses scent. Housing 11 defines intake opening 28 and axially aligned exhaust opening 29 which are generally circular and allow fluid communication through chamber 18.

Toggle switch 30 extends into first chamber 15 and is connected by wires 31 to batteries 35 in second chamber 16. Wires 31 pass through a small opening (not shown) in the lower half of wall 12 and will be explained further below in the discussion of the electrical schematic of FIG. 5. Batteries 35 are preferably two conventional nine volt batteries (only the top one shown). Batteries 35 are held in place by the close proximity of walls 12 and 13. Conventional six prong, twenty-six (26) AWG battery snaps (not shown) provide electrical connections to batteries 35, and wires 37 direct this battery power to other locations within housing 11 through conventional electrical connections. While two nine volt batteries are preferred, one nine volt of even eight AA batteries could be used with appropriate connections, as is well understood.

Chamber 17 contains electrical circuitry 40 which is in electrical communication with switch 30, batteries 35 and fan 50. Electrical circuitry 40 is positioned on a conventional printed circuit board, and may be located within a housing (not shown) to protect electrical circuitry 40 from the elements. Fan 50 is mounted in fan opening 51 defined by aluminum fan wall 52. Fan opening 51 is linearly aligned with intake opening 28 and exhaust opening 29. Fan wall 52 is longitudinally oriented as opposed to the lateral orientations of plastic walls 12–14. Fan 50 is a conventional electric fan such as Product # KD1202PFB2 sold by Sunon through Jameco Electronic Components of Belmont Calif., 94002. Fan 50 is rated as a 12 V DC fan with an air flow of 2.0 cubic feet per minute, and is approximately 2.54 cm×2.54 cm×1.02 cm. While this fan is preferred, other comparable fans could be used. Fan 50 is electrically connected to electrical circuitry 40 by wires 53 which pass through a small opening (not shown) in wall 14 to chamber 17.

Also located within chamber 18 is scent receptacle 60, which is preferably a generally cylindrical cup-like plastic container 61. Scent receptacle 60 includes flexible loop 62 which allows container 61 to be inserted and removed from housing 11 without touching container 61. Disposed within container 61 is means for absorbing fluid 63 and scent emitting fluid 64. In practice, means 63 for absorbing fluid is a sponge or cloth which is dipped in scent emitting fluid 64 and absorbs some portion thereof. Alternatively, scent emitting fluid 64 could be squirted onto absorbing means 63. Scent receptacle 60 is placed on the exhaust side of fan 50 so that air is drawn through intake opening 28 through fan 50, across scent receptacle 60 and out exhaust opening 29 as generally indicated by arrows 65. Other means for emitting scent are contemplated, such as a scent emitting liquid alone. Likewise, bait or chum may be placed in housing 11. Such similar means of emitting scent are within the scope of the present invention.

In FIG. 2, scent dispenser 10 is seen with lid or top 24 attached to housing 11 by fasteners 20. Conventional 3/16"× 1.5" (0.48 cm×3.81 cm) eye bolt 25 is attached to top 24 conventionally and provides a means to suspend scent dispenser 10 from a tree limb or other similar item (not shown). String, thread or other similar device (not shown) can be threaded through eye bolt 25 and then tied to the selected item. In this manner, scent dispenser 10 can be aerially positioned so that the scent emitted is not dispersed directly onto the ground. Thus, the scent can remain airborne longer in order to increase the likelihood of game detecting the scent and investigating. Eye bolt 25 is preferably mounted in the center of top 24, but can be in any orientation or location. Likewise, other mounting means are contemplated by the present invention. A screw or bolt (not shown) could be affixed to housing 11 and threaded into a tree at a desired height so that housing 11 is directly mounted on the tree rather than being suspended therefrom. Toggle switch 30 is also seen in three positions indicated by ghost images 30'. Top 24 defines top opening 26, which is sized to allow scent receptacle 60 to pass therethrough (seen in FIG. 4). This allows the user to grasp loop 62 and lower scent receptacle 60 into housing 11, or replenish scent producing fluid 64 without removing top 24.

Figure 3:
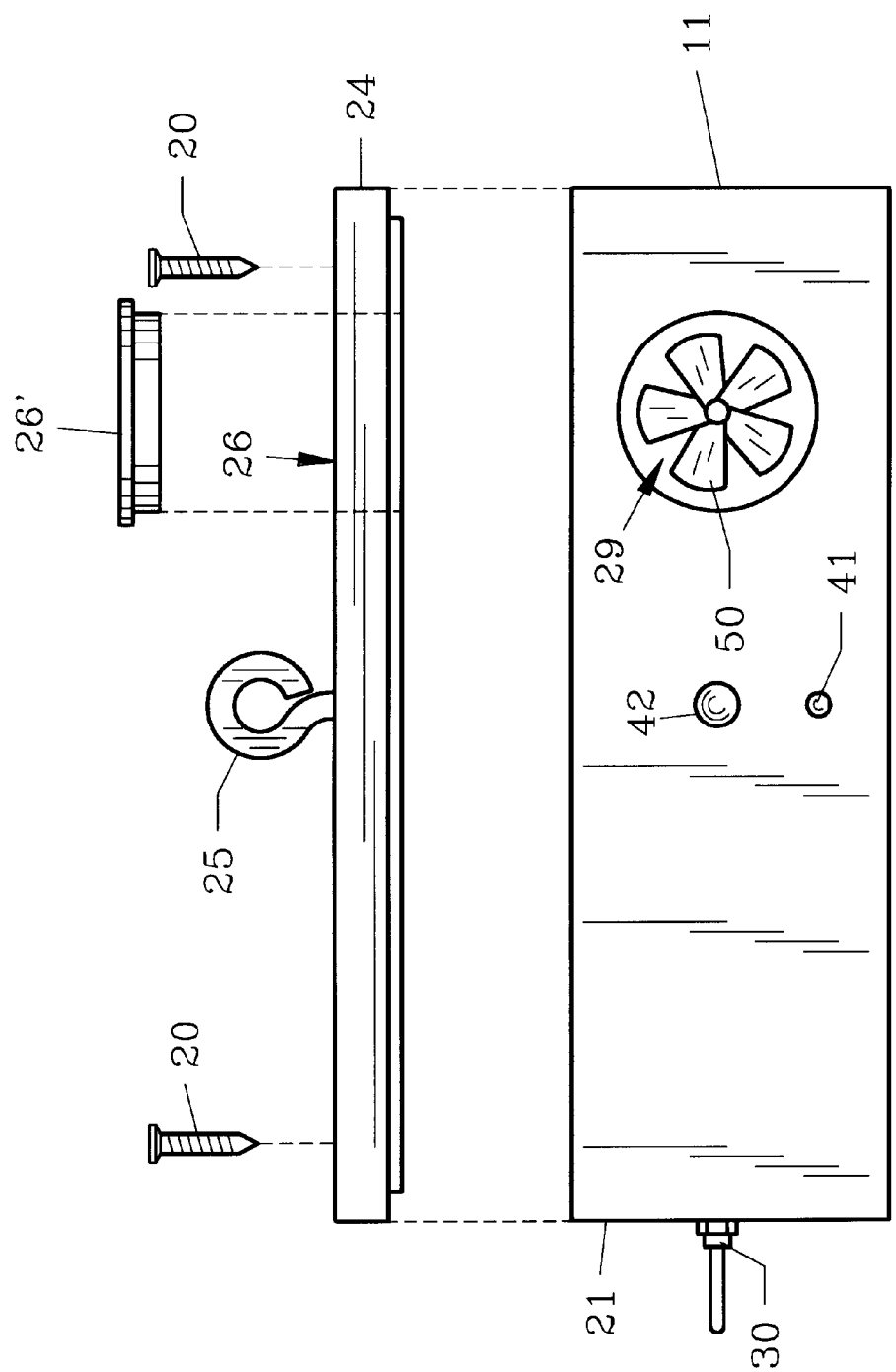
FIG. 3 demonstrates a partial exploded view of the scent dispenser of FIG. 1.

FIG. 3 provides a better understanding of the attachment of top 24 to housing 11 by fasteners 20. Also seen is LED 41 and photo cell 42. These are positioned on the exterior of housing 11. LED 41 is lit when toggle switch 30 is in the automatic position, but fan 50 is inactive. Photo cell 42 detects light intensity proximate scent dispenser 10 and will turn fan 50 on when the light intensity reaches a certain level as will be explained in greater detail below.

Figure 4:
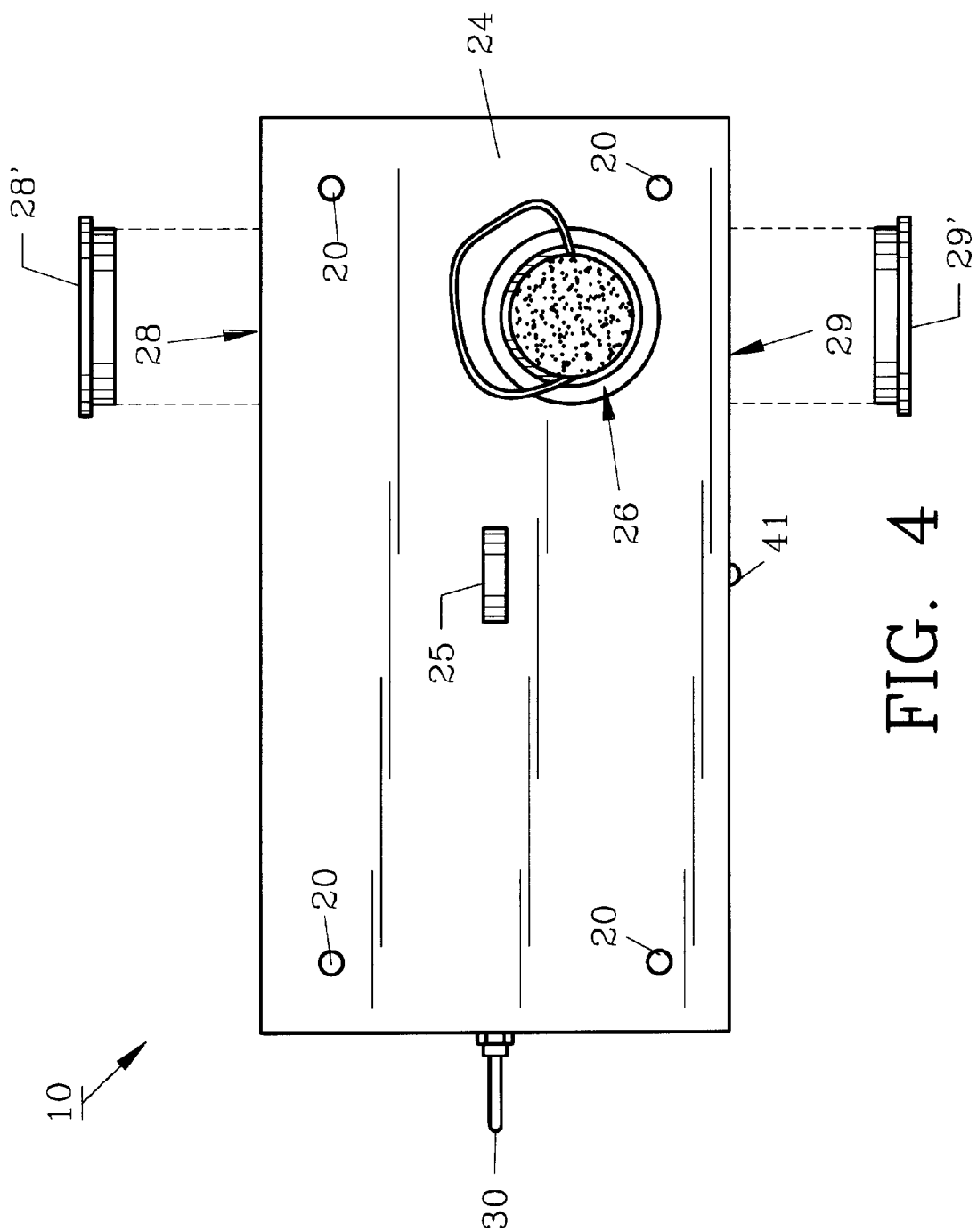
FIG. 4 depicts a top view of the scent dispenser of FIG. 1 with the top in place.

Top 24 defines top opening 26 as seen in FIG. 4 and is positioned above chamber 18 on the exhaust side of fan 50, and loop 62 extends through top opening 26 so that scent receptacle 60 may be manipulated without opening housing 11 by removing top 24. An alternate embodiment (not shown) does not have top opening 26 and scent receptacle 60 can be placed in housing through exhaust opening 29.

As seen in FIGS. 1–4, top plug 26' fits top opening 26 and seals it as desired by the user. Likewise, intake plug 28' and exhaust plug 29' fit intake opening 28 exhaust opening 29 respectively to thereby selectively seal said openings. In use, both plugs 28' and 29' would be removed so that fan 50 can circulate air freely through chamber 18 of housing 11.

Figure 5:
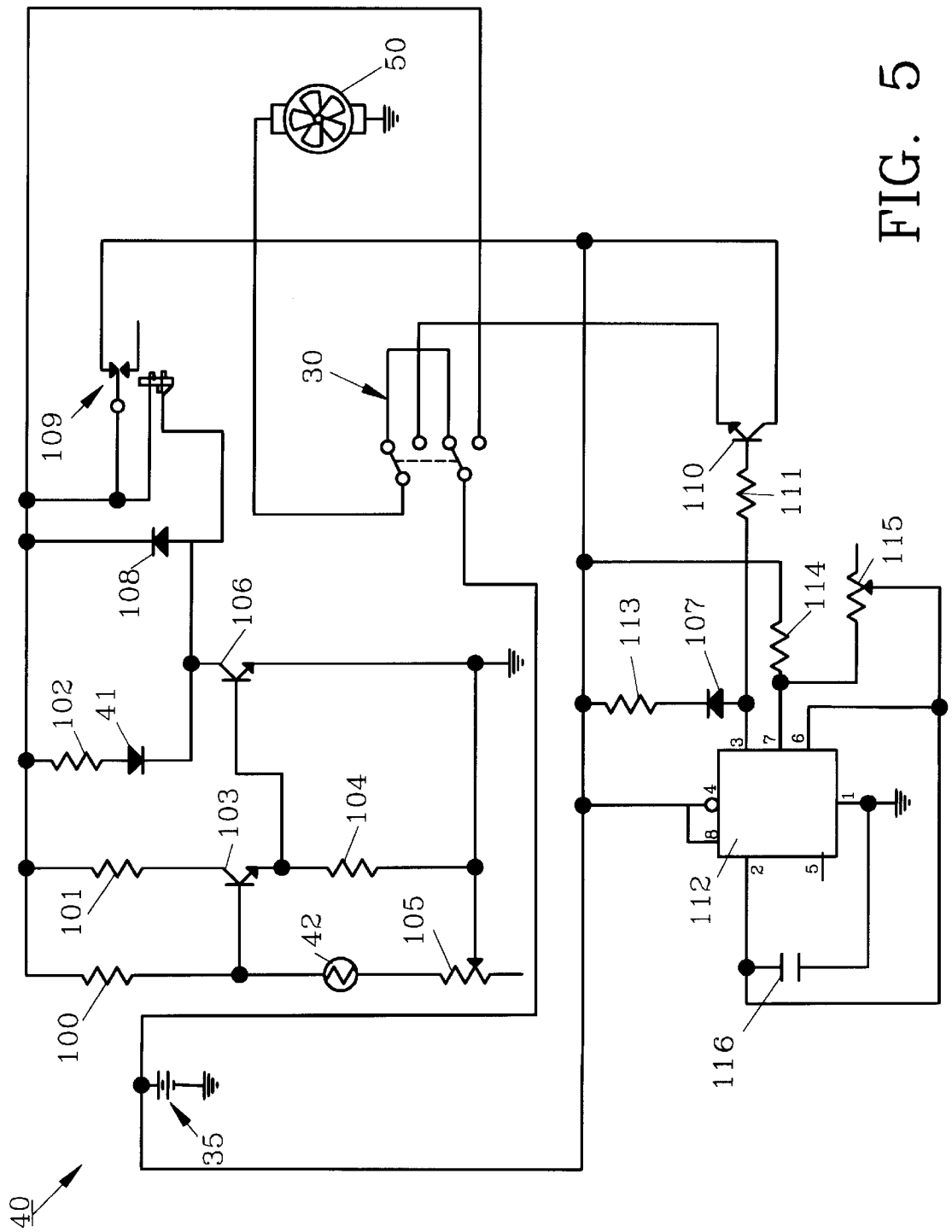
FIG. 5 features a schematic diagram of the internal electrical circuitry of the scent dispenser of FIG. 1.

FIG. 5 illustrates the electrical schematic of internal electrical circuitry 40. Electrical circuitry 40 is generally positioned on a printed circuit board as is conventional. This circuit board may be contained within a housing to protect circuitry 40 from the elements, but such a housing is optional. Likewise, fan 50, toggle switch 30, batteries 35, LED 41 and photo cell 42 are positioned in housing 11 as indicated elsewhere in the specification. Specifically seen is switch 30 which electrically connects fan 50 to batteries 35 when in the manual position. Note that in FIG. 5, switch 30 is in the manual position. It should be understood that in the off position switch 30 creates an open circuit so that electrical circuitry 40 is inoperable. In the automatic position all of electrical circuitry 40 is in electrical connection as detailed below in order to turn fan 50 on and off in intervals, effectively doubling the life of batteries 35. Circuitry 40 works as follows. When sufficient light strikes photo cell 42, the resistance of photo cell 42 changes from essentially an open circuit to a closed circuit. As the light intensity increases, the resistance lessens so as to activate transistors 103 and 108, which in turn activate LED 41 and relay 109. Diode 108 protects transistors 103 and 106 from current and voltage fluctuations associated with relay 109. When fan 50 is on, LED 41 is off, thus the hunter or viewer can determine whether fan 50 is on or off. Relay 109 enables the timing part of circuit 40. Batteries 35 supply nine volts to conventional 555 timer 112, diode 107 and transistor 110. Timer 112 energizes fan 50 in pulses of selected duration so as to turn fan 50 on and off for selected periods of time and thus dispense scent for selected periods of time, preferably three minutes, but any time interval is within the scope of the present invention.

Resistor 100 is a 56 kω resistor; resistors 101 and 102 are both in parallel with resistor 100 and are 3 kω resistors. Photo cell 42, which is preferably a cadmium sulfide photo electric cell, is in series with resistor 100 and in parallel with transistor 103. Transistors 103 and 106 are preferably 2SC945 N-P-N transistors, but any number of comparable transistors would be acceptable. Resister 104 is a 47 kω resistor and is electrically connected to transistor 103 and 5 kω Trim Pot 105. Transistor 106 is in parallel with resistor 104 and in series with parallel diodes 41 and 108. Diode 108 is a 1N4148 diode, but comparable diodes could be used. Relay 109 is a single pole, double throw relay and enables the timing part of the circuit so that fan 50 may be enabled. Transistor 110 is electrically connected to resistor 111 which in turn feeds conventional LM555 timer 112. Resister 111 is preferably a 47 kω resistor. Resister 113 is a 1 kω resistor and is in series with LED 107. LED 107 and resistor 113 are optional and mainly designed to indicate if circuitry 40 is operating as desired. Resistor 114 is also a 1 kω resistor and in parallel with 1 Mω Trim Pot 115. Capacitor 116 is a 1000 μF capacitor. As would be understood, variations in the values for the capacitor and resistors of electrical circuitry 40 changes the length of time that fan 50 operates and the light intensity at which circuitry 40 is activated.

Preferred scent receptacle 60 in FIG. 6 is removed from scent dispenser 10. Scent receptacle 60 comprises plastic cup-like container 61, flexible loop 62 which is preferably cloth or plastic and means 63 to absorb scent such as a resilient synthetic sponge or cloth. As seen, fluid 64 has been fully absorbed.

The preferred method of using scent dispenser 10 comprises selecting a conventional scent, preferably in liquid form such as scent emitting fluid 64 and soaking means 63 in fluid 64. Soaked absorbing means 63 is then placed in container 61 which in turn is placed inside housing 11 through top opening 26 while holding loop 62. A string (not shown) is threaded through eye bolt 25 and tied to a tree limb (not shown) thereby suspending scent dispenser 10. The hunter flips toggle switch 30 to the preferred automatic position and assumes a remote position with scent dispenser 10 visible. When the light level or intensity is sufficient, preferably during daylight or early morning hours, photo cell 42 activates electrical circuitry 40 which, in turn, operates fan 50 for predetermined time intervals thereby selectively dispensing scent. When fan 50 is active, LED 41 is off and when fan 50 is not running, LED 41 is on so that the hunter knows exactly when scent is being dispensed for desired game luring.

The preceding recitation is provided as an example of the preferred embodiment and is not meant to limit the nature or scope of the present invention.

I claim:

1. A scent dispenser comprising:
   a) a housing, said housing defining an intake opening and an exhaust opening;
   b) a scent receptacle, said scent receptacle within said housing;
   c) means to emit a scent, said scent emitting means disposed within said scent receptacle;
   d) electrical circuitry, said electrical circuitry within said housing, said electrical circuitry comprising a printed circuit board;
   e) a first interior wall, a second interior wall, a third interior wall, said first, second and third interior walls laterally positioned within said housing for dividing said housing into first, second, third and fourth interior chambers respectively;
   f) a longitudinal interior wall, said longitudinal interior wall within said fourth chamber, said longitudinal interior wall defining a fan opening, said intake opening and said exhaust opening within said fourth chamber, said longitudinal interior wall between said intake and said exhaust openings with said fan opening in axial alignment therewith;
   g) an electric fan, said electric fan proximate said fan opening and connected to said electrical circuitry; and
   h) an LED, said LED connected to said electrical circuitry and positioned externally of said housing for determining when said electric fan is off;
   whereby said fan draws air through said intake across said scent receptacle and out said housing through said exhaust opening.

2. The scent dispenser of claim 1 further comprising a timer, said timer connected to said electrical circuitry, said timer for selectively turning on said fan.

3. The scent dispenser of claim 1 wherein said first chamber is laterally disposed within said housing.

4. The scent dispenser of claim 1 further comprising a photo cell, said photo cell connected to said electrical circuitry to selectively turn said fan on.

5. The scent dispenser of claim 1 further comprising an intake plug, said intake plug adapted to fit said intake opening.

6. The scent dispenser of claim 5 further comprising an exhaust plug, said exhaust plug adapted to fit said exhaust opening.

7. The scent dispenser of claim 1 wherein said housing comprises a top, said top defining a top opening, said top opening sized to allow passage of said scent receptacle.

8. The scent dispenser of claim 7 further comprising a top plug, said top plug adapted to fit said top opening.

* * * * *